United States Patent
Bathiche et al.

(10) Patent No.: US 10,356,399 B2
(45) Date of Patent: Jul. 16, 2019

(54) OPTIMIZATION OF A MULTI-VIEW DISPLAY

(71) Applicant: Microsoft Technology Licensing, LLC, Redmond, WA (US)

(72) Inventors: Steven Bathiche, Kirkland, WA (US); Jaron Zepel Lanier, Sausalito, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

(21) Appl. No.: 14/949,550

(22) Filed: Nov. 23, 2015

(65) Prior Publication Data
US 2016/0080736 A1 Mar. 17, 2016

Related U.S. Application Data

(63) Continuation of application No. 12/819,239, filed on Jun. 21, 2010, now Pat. No. 9,225,975.

(51) Int. Cl.
*H04N 13/32* (2018.01)
*H04N 13/305* (2018.01)
(Continued)

(52) U.S. Cl.
CPC .......... *H04N 13/398* (2018.05); *H04N 13/32* (2018.05); *H04N 13/356* (2018.05);
(Continued)

(58) Field of Classification Search
CPC ......... H04N 19/00769; H04N 13/0404; H04N 13/0409; H04N 13/0454; H04N 13/0497;
(Continued)

(56) References Cited

U.S. PATENT DOCUMENTS

| 5,544,268 A | 8/1996 | Bischel et al. |
| 5,771,066 A | 6/1998 | Barnea |

(Continued)

FOREIGN PATENT DOCUMENTS

| WO | 2005/009052 A1 | 1/2005 |
| WO | 2008/122838 A1 | 10/2008 |
| WO | 2009/057030 A1 | 5/2009 |

OTHER PUBLICATIONS

Christoudias et al., "Multi-View Learning in the Presence of View Disagreement", Proceedings of Conference on Uncertainty in Artificial Intelligence (UAI), Jul. 30, 2008, 9 pages.

(Continued)

*Primary Examiner* — Farhan Mahmud
(74) *Attorney, Agent, or Firm* — Rainier Patents, P.S.

(57) ABSTRACT

Described herein is a multi-view display (based on spatial and/or temporal multiplexing) having an optimization mechanism that dynamically adjust views based upon detected state changes with respect to one or more views. The optimization mechanism determines viewing parameters (e.g., brightness and/or colors) for a view based upon a current position of the view, and/or on the multi-view display's capabilities. The state change may correspond to the view (a viewer's eye) moving towards another viewing zone, in which event new viewing parameters are determined, which may be in anticipation of entering the zone. Another state change corresponds to more views being needed than the display is capable of outputting, whereby one or more existing views are degraded, e.g., from 3D to 2D and/or from a personal video to a non-personal view. Conversely, a state change corresponding to excess capacity becoming available can result in enhancing a view to 3D and/or personal.

20 Claims, 3 Drawing Sheets

(51) Int. Cl.
| | |
|---|---|
| *H04N 13/356* | (2018.01) |
| *H04N 13/366* | (2018.01) |
| *H04N 13/368* | (2018.01) |
| *H04N 13/376* | (2018.01) |
| *H04N 13/398* | (2018.01) |

(52) U.S. Cl.
CPC ......... *H04N 13/366* (2018.05); *H04N 13/368* (2018.05); *H04N 13/305* (2018.05); *H04N 13/376* (2018.05)

(58) Field of Classification Search
CPC ........... H04N 13/0402; H04N 13/0282; G02B 27/2214; G09G 3/003; G09G 2320/028
See application file for complete search history.

(56) References Cited

U.S. PATENT DOCUMENTS

| | | | |
|---|---|---|---|
| 6,055,012 | A | 4/2000 | Haskell et al. |
| 6,798,409 | B2 | 9/2004 | Thomas |
| 7,483,043 | B2 | 1/2009 | Morgan |
| 7,738,050 | B2 | 6/2010 | Yamazaki et al. |
| 8,144,079 | B2 | 3/2012 | Mather et al. |
| 8,384,710 | B2 | 2/2013 | Schlottmann |
| 9,225,975 | B2 | 12/2015 | Bathiche et al. |
| 2001/0001566 | A1 | 5/2001 | Moseley et al. |
| 2002/0126389 | A1 | 9/2002 | Moseley et al. |
| 2003/0025995 | A1 | 2/2003 | Redert |
| 2004/0130501 | A1 | 7/2004 | Kondo et al. |
| 2004/0192430 | A1 | 9/2004 | Burak et al. |
| 2007/0013624 | A1 | 1/2007 | Bourhill |
| 2007/0216828 | A1 | 9/2007 | Jacobs |
| 2008/0068329 | A1 | 3/2008 | Shestak |
| 2008/0068446 | A1 | 3/2008 | Barkley et al. |
| 2008/0088935 | A1 | 4/2008 | Daly |
| 2008/0316378 | A1 | 12/2008 | Huang et al. |
| 2009/0002819 | A1 | 1/2009 | Kim et al. |
| 2009/0040426 | A1 | 2/2009 | Mather et al. |
| 2009/0251638 | A1 | 10/2009 | Hsu |
| 2009/0295835 | A1 | 12/2009 | Husoy |
| 2010/0002006 | A1 | 1/2010 | Mauchly et al. |
| 2010/0002079 | A1 | 1/2010 | Krijn et al. |
| 2010/0026797 | A1 | 2/2010 | Meuwissen et al. |
| 2010/0164861 | A1 | 7/2010 | Ju |
| 2010/0208033 | A1 | 8/2010 | Edge et al. |
| 2011/0090413 | A1 | 4/2011 | Liou |
| 2011/0157339 | A1 | 6/2011 | Bennett |
| 2011/0164188 | A1 | 7/2011 | Karaoguz et al. |
| 2011/0193863 | A1* | 8/2011 | Gremse ................ G02B 27/225 345/419 |
| 2011/0261169 | A1 | 10/2011 | Tin |
| 2011/0285968 | A1 | 11/2011 | Huang |
| 2011/0310232 | A1 | 12/2011 | Wilson |
| 2012/0013651 | A1* | 1/2012 | Trayner ................. G02B 5/32 345/690 |
| 2012/0092573 | A1 | 4/2012 | Chen |

OTHER PUBLICATIONS

Hubner et al., "Single-Pass Multi-View Volume Rendering", Proceedings of the IADIS International Conference Computer Graphics and Visualization, 2007, 9 pages.
Matusik et al., "Distributed Rendering for Multiview Parallax Displays", retrieved at << http://graphics.ucsd.edu/~matthias/Papers/DistributedRenderingForMultiviewParallaxDisplays.pdf >>, Proceedings of Stereoscopic Displays and Virtual Reality Systems XIII, 2006, 10 pages.
"Autostereoscopy", retrieved on May 13, 2010 from << http://en.wikipedia.org/wiki/Autostereoscopy >>, May 12, 2010, pp. 1-2, 2 pages.
Non-Final Office Action dated Oct. 18, 2012 from U.S. Appl. No. 12/819,239, 24 pages.
Response filed Feb. 14, 2013 to the Non-Final Office Action dated Oct. 18, 2012 from U.S. Appl. No. 12/819,239, 11 pages.
Final Office Action dated Jun. 20, 2013 from U.S. Appl. No. 12/819,239, 24 pages.
Response filed Oct. 9, 2013 to the Final Office Action dated Jun. 20, 2013 from U.S. Appl. No. 12/819,239, 12 pages.
Non-Final Office Action dated Nov. 22, 2013 from U.S. Appl. No. 12/819,239, 28 pages.
Response filed Feb. 24, 2014 to the Non-Final Office Action dated Nov. 22, 2013 from U.S. Appl. No. 12/819,239, 15 pages.
Final Office Action dated Jun. 24, 2014 from U.S. Appl. No. 12/819,239, 49 pages.
Response filed Oct. 23, 2014 to the Final Office Action dated Jun. 24, 2014 from U.S. Appl. No. 12/819,239, 20 pages.
Notice of Allowance and Applicant-Initiated Interview Summary dated Feb. 23, 2015 from U.S. Appl. No. 12/819,239, 24 pages.
Notice of Allowance dated Aug. 27, 2015 from U.S. Appl. No. 12/819,239, 10 pages.
Corrected Notice of Allowability dated Oct. 30, 2015 from U.S. Appl. No. 12/819,239, 6 pages.
Preliminary Amendment filed Nov. 23, 2015 from U.S. Appl. No. 14/949,550, 7 pages.
Restriction Requirement dated Aug. 17, 2012 from U.S. Appl. No. 12/819,238, 6 pages.
Response filed Sep. 17, 2012 to Restriction Requirement dated Aug. 17, 2012 from U.S. Appl. No. 12/819,238, 6 pages.
Non-Final Office Action dated Oct. 17, 2012 from U.S. Appl. No. 12/819,238, 11 pages.
Response filed Feb. 14, 2013 to the Non-Final Office Action dated Oct. 17, 2012 from U.S. Appl. No. 12/819,238, 9 pages.
Final Office Action dated Jun. 7, 2013 from U.S. Appl. No. 12/819,238, 12 pages.
Response filed Sep. 24, 2013 to the Final Office Action dated Jun. 7, 2013 from U.S. Appl. No. 12/819,238, 11 pages.
Non-Final Office Action dated Jan. 30, 2014 from U.S. Appl. No. 12/819,238, 10 pages.
Response filed Apr. 10, 2014 to the Non-Final Office Action dated Jan. 30, 2014 from U.S. Appl. No. 12/819,238, 13 pages.
Applicant-Initiated Interview Summary dated Apr. 28, 2014 from U.S. Appl. No. 12/819,238, 3 pages.
Non-Final Office Action dated May 6, 2014 from U.S. Appl. No. 12/819,238, 19 pages.
Response filed Aug. 19, 2014 to the Non-Final Office Action dated May 6, 2014 from U.S. Appl. No. 12/819,238, 16 pages.
Non-Final Office Action dated Sep. 18, 2014 from U.S. Appl. No. 12/819,238, 9 pages.
Response filed Dec. 9, 2014 to the Non-Final Office Action dated Sep. 18, 2014 from U.S. Appl. No. 12/819,238, 11 pages.
Final Office Action dated Feb. 23, 2015 from U.S. Appl. No. 12/819,238, 19 pages.
Appeal Brief filed Aug. 31, 2015 from U.S. Appl. No. 12/819,238, 18 pages.
Examiner's Answer dated filed Jan. 15, 2016 from U.S. Appl. No. 12/819,238, 20 pages.
Reply Brief filed Feb. 25, 2016 to the Examiner's Answer dated filed Jan. 15, 2016 from U.S. Appl. No. 12/819,238, 5 pages.
"Decision on Appeal Issued in U.S. Appl. No. 12/819,238", dated Jan. 30, 2018, 8 Pages.
"Non Final Office Action Issued in U.S. Appl. No. 12/819,238", dated Apr. 26, 2018, 14 Pages.
"Notice of Allowance Issued in U.S. Appl. No. 12/819,238", dated Jun. 8, 2018, 8 Pages.

* cited by examiner

OPTIMIZATION OF A MULTI-VIEW DISPLAY

CROSS-REFERENCE TO RELATED APPLICATION

The present application is related to the U.S. patent application entitled "Spatial and Temporal Multiplexing Display," (U.S patent application Ser. No. 12/819,238, now U.S. Pat. No. 10,089,937) assigned to the assignee of the present application, filed concurrently herewith and hereby incorporated by reference.

BACKGROUND

A multi-view display allows different images to be seen from different points of view. This includes spatial multiplexing technology or directed backlight technology, in which lenses in front of light sources direct the light from illuminated pixels to different views.

In displays that use spatial multiplexing technology, increasing the number of views degrades the resolution of each view. In displays that use directed backlight technology, increasing the number of views reduces the frame rate for each view. Thus, one problem with a multi-view display is that the practical number of distinct views that can be output is limited by needing reasonable resolution to provide a decent image, or a fast enough frame rate to provide video without perceptible flicker. The number of views that may be needed may exceed that practical number of distinct views.

For example, a multi-view display capable of outputting eight views can show personal 2D video to eight people, or personal 3D video to four people (one view to each eye of each person, which directed backlighting can do without needing 3D glasses). However, if there are nine people watching a 2D video, or five watching a 3D video, the multi-view capabilities of the display device are exceeded. Moreover, the state of the views may change as people move between viewing zones, leave a room, or enter a room.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a multi-view display (based on spatial and/or temporal multiplexing) is configured with an optimization mechanism that dynamically adjust views based upon a detected state change, e.g., by an eye tracking component. In general, the optimization mechanism determines the viewing parameters for a view based upon a current position of the view, and/or on the capabilities of the multi-view display device.

In one aspect, the state change corresponds to the view (a viewer's eye) moving in one viewing zone towards another viewing zone. The optimization mechanism, which is associated with an anticipation algorithm, changes the viewing parameters (e.g., brightness and/or color values) according to an optimization model to new parameters for the other zone, in anticipation of the view moving into the other zone. In this manner, a changed view is generated for the new zone before the view moves into the new zone. In the event that another view is already in the other zone, the optimization model instead computes backed off parameters for the view and the other view.

In one aspect, the state change corresponds to a need for another new view that when combined with existing views exceeds the total view capabilities of the device. In response, the optimization mechanism changes the viewing parameters for the view by degrading the view, e.g., from a personal view to a non-personal view, and/or from a 3D view (e.g., the left-eye or right eye part) to a 2D view. In the event that excess capability becomes available with respect to generating the total number of views, the optimization mechanism may change the viewing parameters for the view by enhancing the view from a non-personal view to a personal view, and/or from a 2D view to a 3D view.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards graceful optimization in a multi-view display that operates to smoothly adapt to state changes with respect to one or more views. As used herein, a "view" may refer to one eye of a person or the single eye of each of a set of multiple people, such as when displaying stereoscopic (3D) video; alternatively, a view may be the same to both of a person's eyes. Different views are generated by spatial multiplexing (lenticular arrays, lenslets), by temporal multiplexing (directed collimated backlight), or (as described in the aforementioned U.S. patent application entitled "Spatial and Temporal Multiplexing Display") by a combination of spatial and temporal multiplexing.

Thus, the number of views and the output parameters to each view (e.g., frame rate, resolution) are dependent on the frame rate capabilities and spatial capabilities of the display device. As described herein, the views are optimized for a current state of the system's views. For example, views may be optimized based upon anticipation of a spatial (viewing zone) change due to a person's movement. An anticipated spatial change may result in computing modified display parameters (e.g., brightness, color and so forth) for the new perspective, so that the transition to a different viewing zone/angle is generally imperceptible. If two or more views that are otherwise independent views wind up in the same viewing zone due to one or more person's movement, (whereby independent views are not able to be displayed), the different views may be backed off (optimized for both viewers to some extent) in some way, such as smoothed together (e.g., averaged) to optimize a single, combined view for the multiple views.

Another aspect of optimization is when there are more views than the capabilities of the display can handle. In such an event, some or all of the current views are degraded to accommodate the extra view or views. When there is excess capacity, some or all of the current views may be enhanced relative to their previous configuration.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing and video technology in general.

Figure 1:
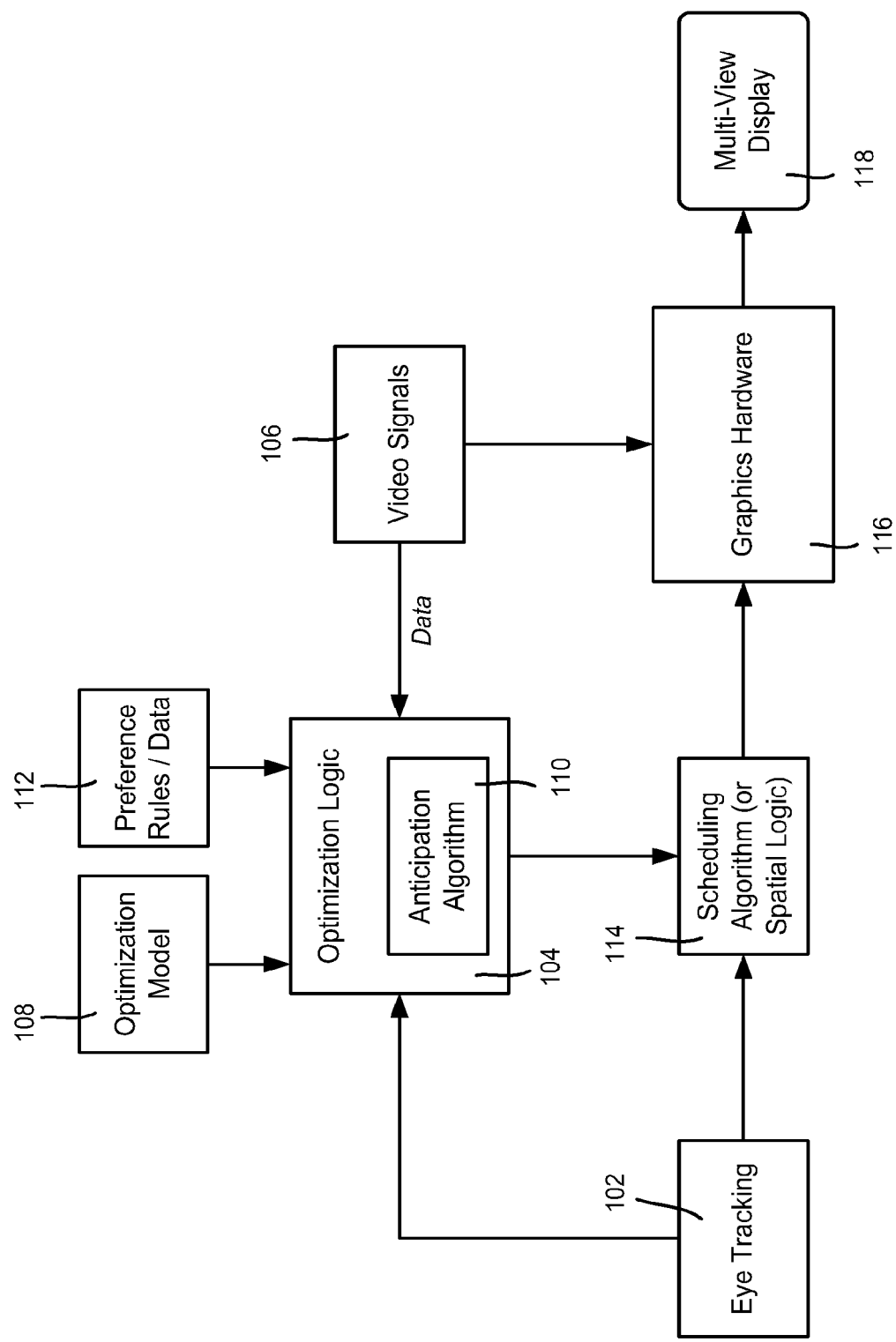
FIG. 1 is a block diagram representing a multiplexing system that optimizes views based upon view position and state changes with respect to the system.

FIG. 1 is a block diagram showing an example implementation that uses spatial or temporal multiplexing, or a combination of spatial and temporal multiplexing, to provide a plurality of (typically) differing views. The various components of FIG. 1 may be implemented in a computing environment external to a display, e.g., in a computer system or gaming console, for example, containing one or more processors and memory to perform spatial and temporal multiplexing. Alternatively, the components may be incorporated into a display device, such as a television set.

In the example of FIG. 1, an eye (head) tracking component 102 (e.g., using one or more cameras and software technology) provides an optimization mechanism (logic) 104 with the current number of views (eyes) and the position of each eye. Note that such head tracking technology already exists, based on known machine vision software technology, and is incorporated into gaming consoles, for example. Notwithstanding, any eye tracking technology may be used as described herein, including technology not yet developed.

Note that the video signals may be anything, such as a single video shot, a mix of different angles of the same 3D scene, a mix of different video shots (e.g., two television programs to distribute between different viewers) and so forth. Further note that if all views are of the same 3D scene but some (or all) views correspond to different viewing zones, the content (the viewing perspective) to show each view may be known based on the current position of that view.

As described herein, the optimization logic 104 determines how to distribute video signals 106 among the views. An optimization model 108 may be accessed by an anticipation algorithm 110 to prepare a new view if a viewer is entering into a new viewing zone, as described below. Preference rules and/or data 112 (which may be fixed defaults for a given display device) may be accessed to determine how to distribute resources and video to the views based on the device's spatial and/or temporal capabilities. For example, the preference rules/data 112 determines how to correlate more views than can be output given the spatial and frame rate capabilities of the device, or conversely, when less than all possible views are present, how to increase resolution and brightness, and/or to which view or views, and so forth. Note that the optimization logic 104 also may input (data corresponding to) the video signals, such as to determine whether the video is 2D or 3D, and also to possibly process content-related information or other video data in determining the distribution, e.g., to give a higher frame rate to people watching one video with a lot of motion, and less to those watching another video with little motion.

Based on how the resources and video are to be distributed among the views, the optimization logic 104 accesses the optimization model 108 for each view to determine optimal parameters for each view. The optimization model 108 may be based upon one or more cameras that provide a closed feedback loop, pre-calibration, theory, and/or experiments, and in general provides data such as brightness, color, chroma and so forth for each view. Note that the parameters may be per light source or may be for multiple light sources (e.g., global) to provide an optimal view according to the model for each view.

If only spatial multiplexing is available on the display device, then the parameters are simply output to spatial logic that divides the video and corresponding view parameters into subsets (e.g., vertical columns) of the pixels to provide the desired number of viewing zones. If temporal multiplexing is available, then a scheduling algorithm uses the parameters and eye positions to determine which light sources are illuminated when, and how, e.g., their brightness and color. Similar scheduling is used when both spatial and temporal multiplexing are available, as described in the aforementioned U.S. patent application. In this manner, the graphics hardware 116 drives the appropriate pixels of the multi-view display 118 to provide multiple views. This may include not illuminating pixels to available views where there is no viewer present, to save energy.

In one aspect, as a view is moving towards a new zone, the anticipation algorithm 110 (e.g., based upon or incorporating a Kalman filter) can prepare that view for the transition. For example, when a view is moving between spatial zones, the fine control of the directed backlight may be used to generate a new lensed view for the new zone (with parameters for the new viewing perspective), and once the person reaches the end of a lenticular zone, switch to the new lensed zone view. Using the optimization model 108 to determine new parameters, the switch may be made imperceptible to the eye.

Figure 2:
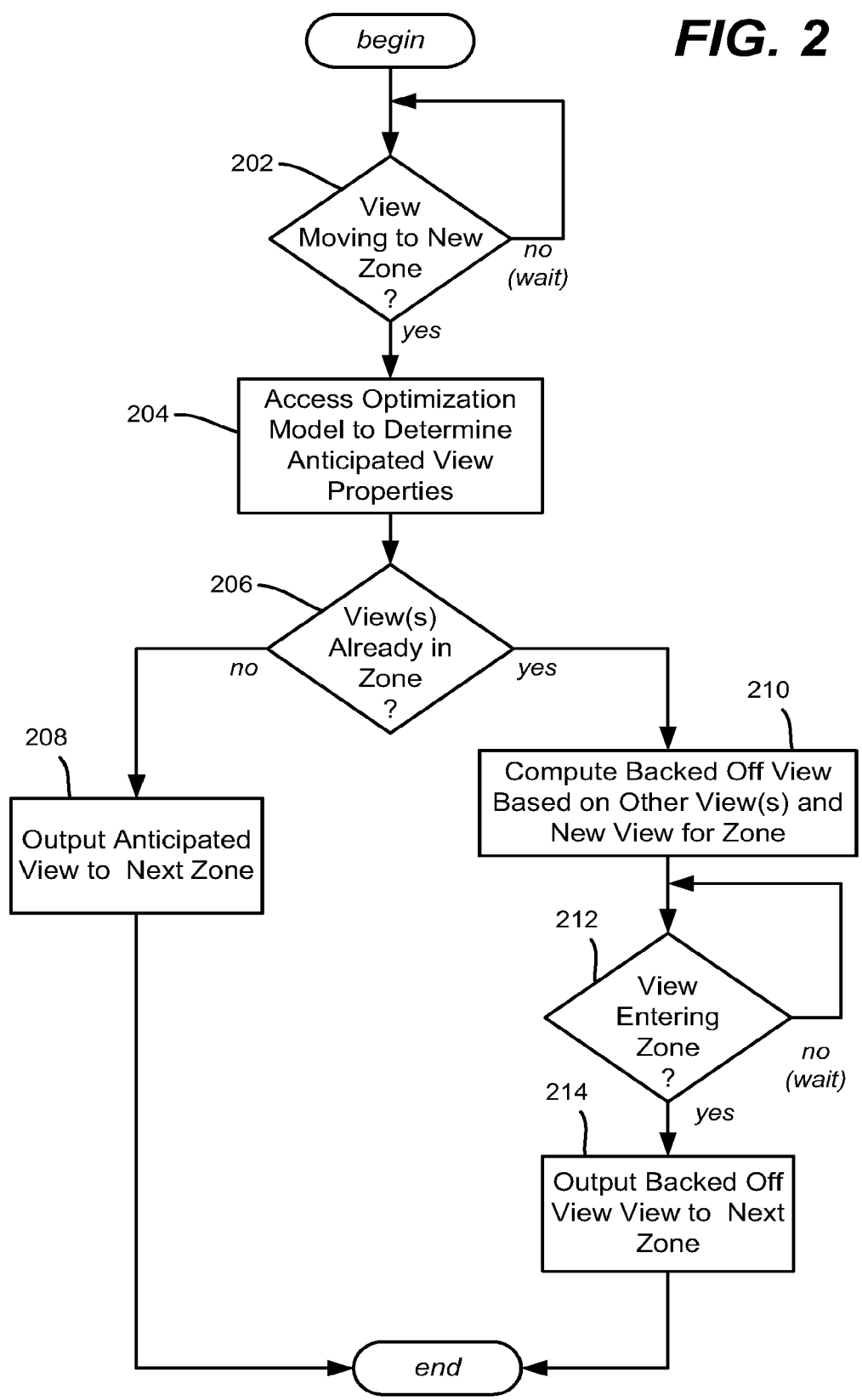
FIG. 2 is a flow diagram representing example steps for optimizing a view based upon a state change in which the view moves towards and/or into another viewing zone.

FIG. 2 shows example logic for anticipating the change to a new (e.g., spatial) zone, beginning at step 202 which represents waiting for a view to be detected as moving to a new zone, e.g., based on the eye tracking position and known zone positions. Note that step 202 may be event driven (rather than looping back and waiting as illustrated for simplicity).

Step 204 represents the optimization logic 104 accessing the optimization model 108 to determine optimal parameters (e.g., brightness, color data and so forth) for the new zone. Note that even if the content being viewed is relatively static, the parameters may need to change because different lenses, distances and so forth apply to the new zone or directed backlight steered photons to the anticipated position.

Step 206 represents determining whether another view is already in that zone, as described below. If not, then the anticipated parameters for the view that were computed/determined may be output (step 208) to the next zone or position in advance. If the eye enters that zone, the view is already present with the appropriate parameters such that the transition is generally imperceptible. Note, however, that an alternative is to have former zone parameters, transition parameters and new zone parameters. For example, if a view is transitioning between zones, then the parameters (e.g., brightness/colors) of the former zone and the parameters of the new zone may be combined (e.g., via an appropriate function) according to the model 108 so that an eye corresponding to the view does not get too much brightness/improper colors just as the view crosses the zone dividing line.

Returning to step 206, it is possible that a view is entering a new zone that already has another, different view (or views) being shown. Consider for example that the right eye of person A enters a zone that person B is already within, viewing video frames. If directed backlight technology is unavailable to provide separate views within the spatial zone, or if the alignment is such that the right eye of person A is aligned with the left eye of person B and directed backlight is only able to collimate the light horizontally (not vertically), then a conflict exists.

Step 210 represents resolving the conflict by computing backed off parameters for the views, that is, the parameters are optimized for multiple views to some extent. For example, the parameters may be averaged or otherwise blended/smoothed for two or more views. This may work up to some number of different views, however if too many views are present, then the optimization logic 104 may instead degrade the device such that all the views in the zone are the same. For example, as described below, instead of personal 3D video where each person gets his or her own view based on their relative position to a scene, the optimization logic 104 may back off the views to non-personal 3D, or 2D for some or all of the viewers. The optimization logic 104 may choose to not show a view, such as if two different television programs corresponding to different views are being watched; the person entering the new view and causing the conflict may see nothing or may be switched to the view of the person that was already viewing in that zone.

As represented by steps 212 and 214, applying the backed off parameters may wait until the person actually enters the new zone. In this manner, for example, a person already in the zone does not receive a degraded view until necessary. However, some transitioning parameters/function may be applied to make the transition to the backed off parameters gradual, e.g., within the current zone at some approaching distance to the new zone, the backed off parameters are computed. As the distance gets closer, a transition function gradually adjusts the current zone parameter values (e.g., more towards the backed off parameter values) so that when the person does enter the zone and the backed off parameters are fully applied, the change is less perceptible to the existing viewer and/or the newly entering viewer.

Another aspect of optimization is directed towards correlating the spatial and/or temporal capabilities of the device with the number of views. For example, when the resolution capacity of a system is exceeded, the optimization logic 104 (e.g., in combination with the optimization model 108 and/or preference rules/data 112) needs to determine how to optimize the views.

By way of example, consider a desired offering of multiple personal 3D views, that is, a private or personal view may be a view that is visible to a person in one location and not visible to a person at another location. A 3D view may be a view that provides a different view to the left and right eye of a user to give the user a sense that the view is three dimensional. Even using the above described multi-view display, the capacity of the display device may be unable generate a sufficient number of (visually acceptable) personal 3D views for the number of viewers.

Various optimization options are available when the capacity is exceeded, generally comprising degrading one or more of the views to accommodate the number needed. Note that degradation may be dynamic, e.g., when a new viewer enters a room and starts looking at the display, the optimization logic 204 recognizes whenever the capacity is exceeded. For example, if the optimization logic 204 recognizes that the display device cannot support giving a personal 3D view to the new person, the display device may take a number of options, e.g., depending on the preference rules data 112 and what capacity is available. Further note that degradation may not be immediate, e.g., simply because a person is passing through a room and glances at the head tracking camera does not mean that existing viewers have their views degraded; degradation to accommodate the new person may be deferred until it is more certain that the new person is actually there to see the display.

By way of an example, the device may not have the capability to give the personal 3D view to the new person, but may have one view left via which the new person may receive a flat 2D picture. As a more particular example, if a display device is capable of outputting nine distinct views (e.g., three spatial times three temporal), four people may be receiving personal 3D video, thereby using eight of the nine possible views. The ninth view thus may be used to output 2D to the new person, as well to as any other person that enters later. For example, this may be accomplished by displaying 2D to all positions (zones and angles) except to those specific eye positions of the four personal 3D viewers.

Another option (when two views are available) is to provide non-personal 2D or 3D to one or more viewers, while other people get personal 3D or 2D. For example, consider that two views are available however two new people enter a room and look at the display. Each may receive personal 2D views (both of each person's eyes get the same view but each person gets a different view). Alternatively, non-personal 3D views may be presented.

If less than the number of views needed is available, one or more existing views need to be degraded as well. For example, if a large number of viewers enter a room, the system may degrade the views so that everyone gets a non-personal 2D view. As can be appreciated, various other techniques can also be used, e.g., degrade all but a privileged (view or views), degrade in time order (last person to start viewing is the first one degraded, and so forth). Other options include choosing the view based on the person/ people sitting closest to the display, sitting closest to the center of the display, to the person who is talking the most or presently talking, to the person/people presently looking (e.g., based on gaze tracking), and so forth.

In contrast to degrading, enhancing the views relative to their previous state (e.g. 2D to 3D/non-personal to personal) is also possible, such as when one or more existing viewers leave the room, causing excess capacity. In general, the same alternatives exist for degradation as to which view (or views) is to be enhanced, and how each such view is to be enhanced.

Figure 3:
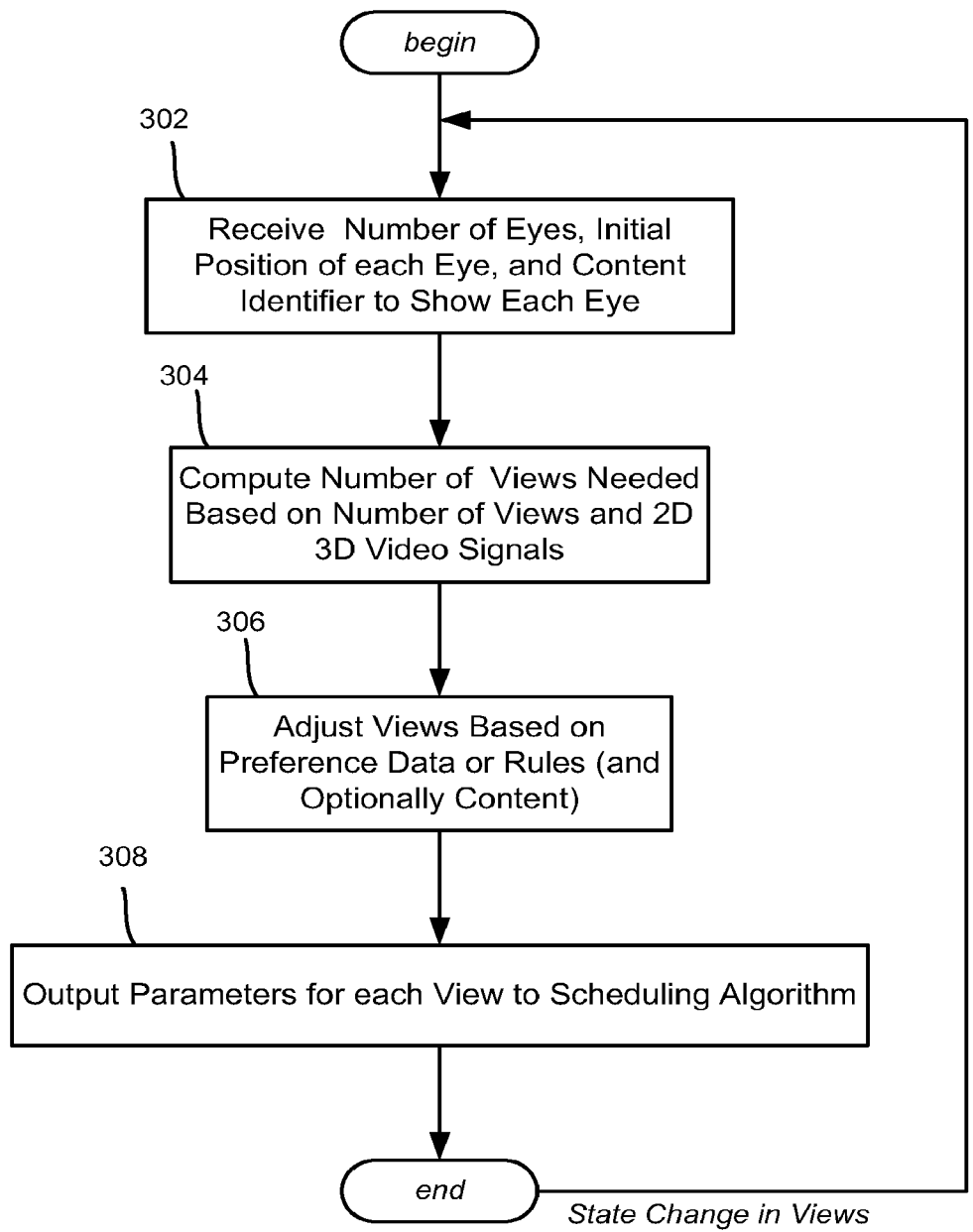
FIG. 3 is a flow diagram representing example steps for optimizing views based on various input including a number of views desired.

FIG. 3 shows some example steps that may be performed by the optimization logic 204, beginning at step 302 where the number of eyes (maximum possible views desired) is received from the head tracking component. At step 304, the optimization logic 204 computes how many views are needed based upon the number of views and the 2D and/or 3D nature of the video signals 206.

As represented by step 306 and as described above, the preference rules/data 112 (and or the optimization model) 108 may be consulted to determine what to do when there is an inexact match between the views needed versus those that can be independently generated, e.g., which view or views are to be degraded (e.g., combined) or enhanced according to the preference data 208, given the current number of possible views. Content-based throttling or enhancement may also be performed, e.g., based on how the preference data specifies that current motion information be used, as also described above.

In general, via step 308 the scheduling algorithm 114 receives these computed/determined parameters from the optimization logic 104. For example, parameters may include an identifier for each view, and the type of output for that view, e.g., personal 3D, personal 2D, non-personal 3D or non-personal 2D. With this information and the position data for each distinct view, the scheduling algorithm 114 then determines the pixels to illuminate (including at what specific times for temporal multiplexing).

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   determining a number of views that a multi-view display is capable of providing, the number of views being limited by both spatial multiplexing and temporal multiplexing capabilities of the multi-view display;
   identifying a required number of views to display three-dimensional video to a plurality of viewers using the multi-view display;
   determining particular times at which to illuminate individual light sources of the multi-view display to display the three-dimensional video to the plurality of viewers;
   detecting presence of a new viewer of the multi-view display, wherein providing three-dimensional video to the plurality of viewers and the new viewer requires more views than the multi-view display is capable of providing; and
   responsive to detecting the presence of the new viewer of the multi-view display:
      selecting a particular viewer, other than the new viewer, to degrade via temporal multiplexing, the particular viewer being selected for degrading based at least on a temporal order in which the particular viewer began viewing the multi-view display relative to other viewers of the plurality; and
      degrading the particular viewer from three-dimensional video having two temporally-multiplexed views to two-dimensional video having a single temporally-multiplexed view while continuing to provide three-dimensional video to the other viewers, the degrading comprising adjusting the particular times at which the individual light sources are illuminated.

2. The method of claim 1, further comprising:
   after degrading the particular viewer to two-dimensional video, upgrading the particular viewer back to three-dimensional video by further adjusting the particular times at which the individual light sources are illuminated.

3. The method of claim 2, further comprising:
   detecting that the new viewer is no longer viewing the multi-view display; and
   upgrading the particular viewer back to the three-dimensional video responsive to detecting that the new viewer is no longer viewing the multi-view display.

4. The method of claim 3, further comprising:
   determining when each of the plurality of viewers began viewing the multi-view display; and
   selecting the particular viewer for degrading based at least on the particular viewer being the most recent viewer of the plurality to begin viewing the multi-view display.

5. A system comprising:
   a multi-view display device having a specified frame rate and capable of providing a frame-rate limited number of views, the multi-view display device having a directed backlight with associated light sources; and
   one or more processors configured via logic to:
      detect a plurality of viewers of the multi-view display device;
      determine whether the frame-rate limited number of views provides sufficient capacity to provide three-dimensional views to the plurality of viewers;
      when the frame-rate limited number of views provides sufficient capacity to provide the three-dimensional views to the plurality of viewers, control the multi-view display device to generate the three-dimensional views for the plurality of viewers by manipulating temporal multiplexing parameters of the multi-view display device that control when the light sources of the directed backlight are illuminated; and
      when an additional viewer is present and the frame-rate limited number of views does not provide sufficient capacity to provide the three-dimensional views to the plurality of viewers and the additional viewer, control the multi-view display device by:
         selecting a particular viewer to degrade via the temporal multiplexing parameters, the particular viewer being selected based at least on talking by the particular viewer; and
         degrading a particular three-dimensional view for the particular viewer by further manipulating the temporal multiplexing parameters of the multi-view display device that control when the light sources of the directed backlight are illuminated.

6. The system of claim 5, wherein the frame-rate limited number of views is also limited based at least on spatial multiplexing capabilities of the multi-view display device.

7. The system of claim 6, wherein the one or more processors are configured via the logic to:
   control vertical columns of pixels of the multi-view display device to generate the three-dimensional views and to degrade the particular three-dimensional view.

8. The system of claim 5, further comprising an eye tracker configured to track eyes of the plurality of viewers, wherein the one or more processors are configured via the logic to:
   detect that the additional viewer is present based at least on information provided by the eye tracker.

9. The system of claim 8, wherein the one or more processors are configured via the logic to:
   degrade the particular three-dimensional view to a two-dimensional view to obtain an available view; and
   using the available view, provide another three-dimensional view to the additional viewer.

10. The system of claim 5, wherein the one or more processors are configured via the logic to:
    determine that the particular viewer is currently talking; and
    select the particular viewer to degrade based at least on the current talking by the particular viewer.

11. The system of claim 5, wherein the one or more processors are configured via the logic to:
    identify multiple talking viewers of the multi-view display device; and
    select the particular viewer to degrade based at least the particular viewer talking more than other talking viewers.

12. A system comprising:
a display device having a specified frame rate and a frame-rate limited number of views that the display device is capable of providing;
a hardware processor; and
logic which, when executed by the hardware processor, causes the hardware processor to:
track the presence of viewers of the display device;
control the display device to provide three-dimensional views to the viewers of the display device by manipulating temporal multiplexing parameters of the display device that control when light sources of the display device are illuminated;
detect new viewers of the display device;
when providing new views to the new viewers will exceed the frame-rate limited number of views that the display device is capable of providing, degrade other viewers to obtain available views, the other viewers being degraded in time order based at least on when the other viewers began viewing the display device; and
use the available views to provide the new views to the new viewers by further manipulating the temporal multiplexing parameters.

13. The system of claim 12, wherein the logic, when executed by the hardware processor, causes the hardware processor to:
provide three-dimensional views to the new viewers.

14. The system of claim 13, wherein the logic, when executed by the hardware processor, causes the hardware processor to:
degrade the other viewers from three-dimensional views to two-dimensional views.

15. The system of claim 14, wherein the logic, when executed by the hardware processor, causes the hardware processor to:
detect the new viewers by detecting that the new viewers have entered a room with the display device.

16. The system of claim 12, wherein, prior to being degraded, each of the three-dimensional views is a personal three-dimensional view that is not visible to at least one other viewer of the display device.

17. The system of claim 16, wherein the display device comprises a directed collimated backlight and the light sources are associated with the directed collimated backlight.

18. The system of claim 17, wherein the logic, when executed by the hardware processor, causes the hardware processor to:
receive image information from one or more cameras; and
using the image information received from the one or more cameras, track the presence of the viewers and detect the new viewers.

19. The system of claim 18, wherein the display device comprises a lenticular array or lenslet.

20. The system of claim 12, wherein the system comprises a memory storing the logic.

* * * * *